(12) United States Patent
Erickson et al.

(10) Patent No.: US 12,036,734 B2
(45) Date of Patent: Jul. 16, 2024

(54) THREE-DIMENSIONAL PRINTING

(71) Applicant: Hewlett-Packard Development Company, L.P., Spring, TX (US)

(72) Inventors: Kristopher J. Erickson, Palo Alto, CA (US); Melanie M. Gottwals, Palo Alto, CA (US); Ingeborg Tastl, Palo Alto, CA (US); Aja Hartman, Palo Alto, CA (US); Adekunle Olubummo, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 118 days.

(21) Appl. No.: 17/298,898

(22) PCT Filed: Jul. 15, 2019

(86) PCT No.: PCT/US2019/041805
§ 371 (c)(1),
(2) Date: Jun. 1, 2021

(87) PCT Pub. No.: WO2021/010961
PCT Pub. Date: Jan. 21, 2021

(65) Prior Publication Data
US 2022/0355543 A1    Nov. 10, 2022

(51) Int. Cl.
*B29C 64/264* (2017.01)
*B29C 35/08* (2006.01)
(Continued)

(52) U.S. Cl.
CPC ........ *B29C 64/165* (2017.08); *B29C 35/0805* (2013.01); *B33Y 10/00* (2014.12);
(Continued)

(58) Field of Classification Search
CPC ........ B29C 35/0805; B29C 2035/0822; B29C 2035/0827; B29C 64/165; B29C 64/264;
(Continued)

(56) References Cited

U.S. PATENT DOCUMENTS 9,527,242 B2    12/2016    Rodgers et al.
2009/0236775 A1   9/2009    Monsheimer et al.
(Continued)

FOREIGN PATENT DOCUMENTS

CN    103992473 A    8/2014
CN    106626376 A    5/2017
(Continued)

OTHER PUBLICATIONS

Mencik, Premysl et al., Effect of selected commercial plasticizers . . . three-dimensional (3D) print, Oct. 3, 2018, Materials.
(Continued)

*Primary Examiner* — Leo B Tentoni
(74) *Attorney, Agent, or Firm* — Dierker & Kavanaugh, P.C.

(57) ABSTRACT

A three-dimensional printing method can include iteratively applying polymer build material as individual layers; based on a three-dimensional object model, selectively jetting an electromagnetic radiation absorber and a translucency-modulating plasticizer onto individual layers of the polymer build material; and exposing the powder bed to electromagnetic energy to selectively fuse portions of individual layers of the polymer build material together to form a three-dimensional object. The polymer build material can include from about 60 wt % to 100 wt % polymeric particles having an average particle size from about 10 ?m to about 150 ?m and a degree of crystallinity from about 2% to about 60%, to a powder bed. At the locations where the polymer build material includes jetted translucency-modulating plasticizer,
(Continued)

the three-dimensional object can exhibit an optical transmittance from about 5% to about 80%.

9 Claims, 4 Drawing Sheets

(51) Int. Cl.
| | |
|---|---|
| *B29C 64/165* | (2017.01) |
| *B29C 64/336* | (2017.01) |
| *B29C 71/04* | (2006.01) |
| *B33Y 10/00* | (2015.01) |
| *B33Y 40/00* | (2020.01) |
| *B33Y 70/00* | (2020.01) |
| *C09D 7/48* | (2018.01) |
| *C09D 7/63* | (2018.01) |
| *C09D 177/02* | (2006.01) |
| *B29K 77/00* | (2006.01) |

(52) U.S. Cl.
CPC ............... *B33Y 70/00* (2014.12); *C09D 7/48* (2018.01); *C09D 7/63* (2018.01); *C09D 177/02* (2013.01); *B29C 2035/0822* (2013.01); *B29C 2035/0827* (2013.01); *B29K 2077/00* (2013.01)

(58) Field of Classification Search
CPC ....... B29C 64/336; B29C 71/04; B33Y 10/00; B33Y 40/00
USPC .................. 264/113, 460, 462, 463, 494
See application file for complete search history.

(56) References Cited

U.S. PATENT DOCUMENTS

| | | |
|---|---|---|
| 2011/0256362 A1 | 10/2011 | Mikkonen et al. |
| 2016/0068014 A1 | 3/2016 | Schacht et al. |
| 2018/0133957 A1 | 5/2018 | Ramirez et al. |
| 2018/0296343 A1 | 10/2018 | Wei |
| 2019/0030788 A1 | 1/2019 | Erickson et al. |
| 2019/0137664 A1 | 5/2019 | Stasiak |
| 2019/0184628 A1 | 6/2019 | Gorin et al. |
| 2020/0039868 A1* | 2/2020 | Rapp ..................... B29C 64/165 |

FOREIGN PATENT DOCUMENTS

| | | | |
|---|---|---|---|
| CN | 108883577 A | 11/2018 | |
| CN | 109476802 A | 3/2019 | |
| DE | 102008000755 A1 | 9/2009 | |
| EP | 2001656 B1 | 10/2014 | |
| EP | 2694274 B1 | 12/2015 | |
| WO | WO-2014080082 A1 | 5/2014 | |
| WO | 2016/168142 A1 | 10/2016 | |
| WO | 2017/131758 A1 | 8/2017 | |
| WO | 2017/188965 A1 | 11/2017 | |
| WO | 2017/196330 A1 | 11/2017 | |
| WO | 2017/196358 A1 | 11/2017 | |
| WO | WO-2017188966 A1 * | 11/2017 | .......... B29C 64/165 |
| WO | WO-2018065093 A1 * | 4/2018 | .......... B29C 64/165 |
| WO | 2019/005044 A1 | 1/2019 | |
| WO | 2019/013749 A1 | 1/2019 | |
| WO | 2019/063740 A1 | 4/2019 | |
| WO | 2019/108288 A1 | 6/2019 | |
| WO | 2020/190334 A1 | 9/2020 | |

OTHER PUBLICATIONS

Hanzhi, P., et al., "Plastics Industry Handbook- Polyamides", Chemical Industry Press, Dec. 2001, p. 332.

* cited by examiner

THREE-DIMENSIONAL PRINTING

BACKGROUND

Methods of three-dimensional (3D) digital printing, a type of additive manufacturing, have continued to be developed over the last few decades. In general, 3D printing technology can change the product development cycle by allowing rapid creation of prototype models or even finished products. For example, several commercial sectors such as aviation and the medical industry, to name a few, have benefitted from rapid prototyping and/or the production of customized parts. There are various methods for 3D printing that have been developed, including heat-assisted extrusion, selective laser sintering, photolithography, additive manufacturing, as well as others. As technology advances, higher demands with respect to production speed, part consistency, rigidity, method flexibility, etc., are requested by customers.

DETAILED DESCRIPTION

Figure 1:
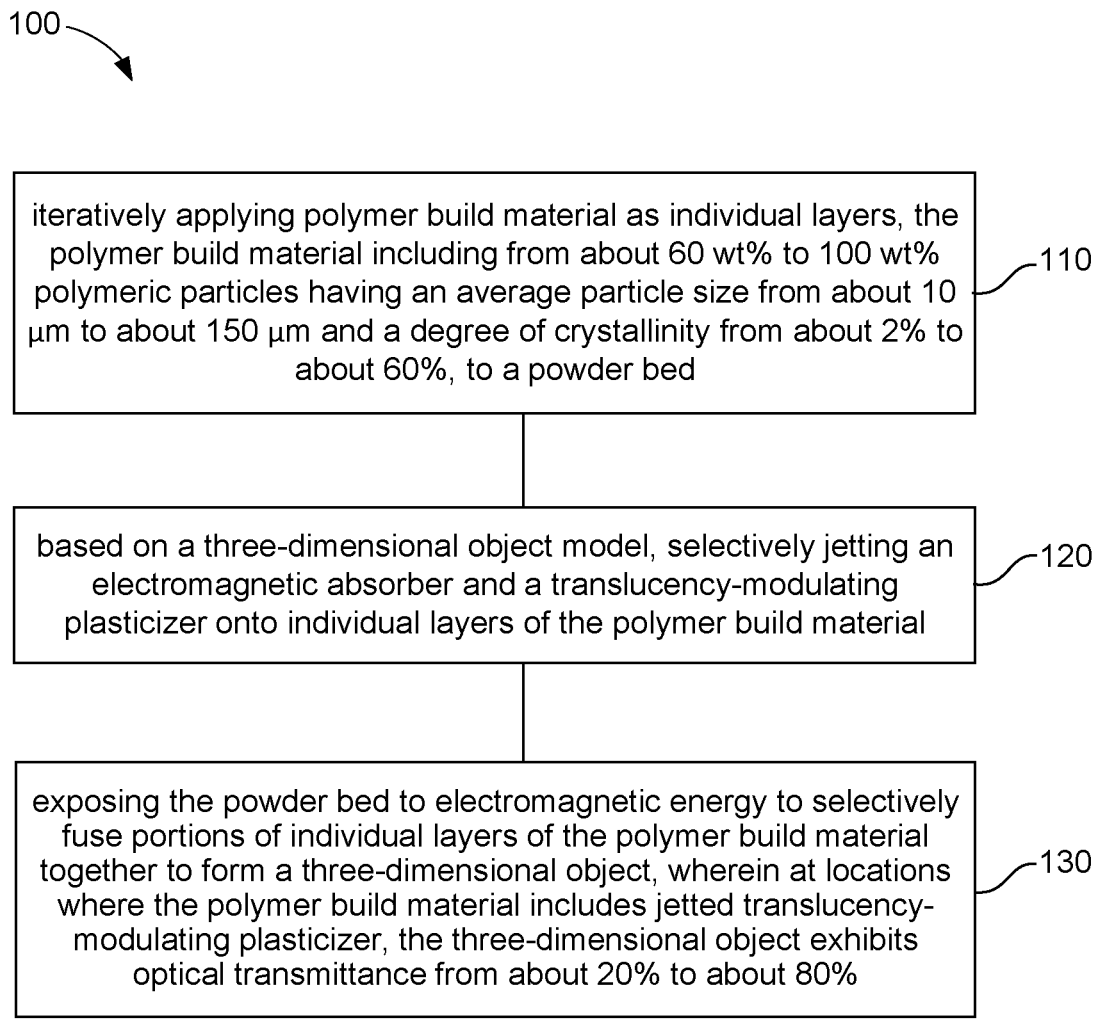
FIG. 1 illustrates an example method for three-dimensional printing in accordance with the present disclosure.

The present disclosure is drawn to three-dimensional (3D) printing methods and 3D printing kits. More particularly, the 3D methods and printing kits can be used with multi-jet fusion (MJF) where polymer build material can be spread on a powder bed on a layer by layer basis. The various layers can be selectively contacted with jetting fluid(s) which can include an electromagnetic radiation absorber and/or an electromagnetic radiation absorber and a translucency-modulating plasticizer. The electromagnetic radiation absorber and translucency-modulating plasticizer can be formulated in a common aqueous liquid vehicle, for example, or can be formulated in two separate aqueous liquid vehicles. The jetting fluid(s) can be ejected from a print head, such as a fluid ejector similar to an inkjet print head, for example, and then the layer can be exposed to electromagnetic radiation to heat the layer of the polymer build material. This can be repeated layer by layer until a three-dimensional object is formed.

The layer of polymer build material, having the electromagnetic radiation absorber applied thereto and other portions can be indiscriminately exposed to electromagnetic radiation, but due to the presence of the electromagnetic radiation absorber in some portions, the absorbed light energy at the portion including the electromagnetic radiation absorber can be converted to thermal energy, causing the polymer build material to melt or coalesce, while portions without the electromagnetic radiation absorber do not melt or coalesce. Furthermore, in accordance with examples of the present disclosure, due to the presence of translucency-modulating plasticizer some portions of a printed three-dimensional object can exhibit optical translucency ranging from about 5% to about 80%. In some examples, an amount of the translucency-modulating plasticizer applied to the polymer bed material can be varied such that an optical translucency of the printed three-dimensional object can vary throughout the article.

In accordance with this, the present disclosure is drawn to a method for three-dimensional printing. The method can include iteratively applying polymer build material as individual layers to a powder bed; based on a three-dimensional object model, selectively jetting an electromagnetic radiation absorber and a translucency-modulating plasticizer onto individual layers of the polymer build material; and exposing the powder bed to electromagnetic energy to selectively fuse portions of individual layers of the polymer build material together to form a three-dimensional object. The polymer build material can include from about 60 wt % to 100 wt % polymeric particles that can have an average particle size ranging from about 10 µm to about 150 µm and a degree of crystallinity from about 2% to about 60%. At the locations where the polymer build material includes the jetted translucency-modulating plasticizer, the three-dimensional object can exhibit optical transmittance from about 5% to about 80%. In one example, the electromagnetic radiation absorber and the translucency-modulating plasticizer can be included in a fusing agent formulation including an aqueous liquid vehicle, the electromagnetic radiation absorber, and the translucency-modulating plasticizer. In another example, the electromagnetic radiation absorber can be included in a fusing agent formulation that can include a first aqueous liquid vehicle and the electromagnetic radiation absorber, and the translucency-modulating plasticizer can be included in a separate plasticizing agent formulation including a second aqueous liquid vehicle and the translucency-modulating plasticizer, wherein the fusing agent formulation and the plasticizing agent formulation can be independently jettable onto the polymer build material at the powder bed. In yet another example, the selectively jetting can include based on the three-dimensional object model, selectively jetting the fusing agent formulation to a first portion of the polymer build material and a second portion of the polymer build material, but not to a third portion of the polymer build material; and based on the three-dimensional object model, selectively jetting the plasticizing agent formulation to the first portion but not the third portion of the polymer build material. The plasticizing agent is not jetted or is jetted at a lower amount to the second portion relative to the amount jetted on the first portion. The three-dimensional object can be formed at the first portion and the second portion, but not at the third portion of the polymer build material. The first portion can be more translucent than the second portion. In a further example, based on the three-dimensional object model, the method can further include jetting a detailing agent onto the individual layers laterally at a border between a first area of the polymer build material contacted by the electromagnetic radiation absorber and a second area of the polymer build material which was not contacted by the electromagnetic radiation absorber. In another example, the exposing the powder bed to electromagnetic energy can raise an individual layer of the polymer build material to a temperature ranging from about 1° C. to about 100° C. above a melting temperature of the polymer build material. The individual layer can be cooled to a temperature of less than about 1° C. below a recrystallization temperature for the polymer build material within about thirty seconds of exposing the powder bed to the electromagnetic energy. In yet another example, a 1 mm thick layer of the polymer build material as free-flowing particles prior to the jetting of the translucency-modulating plasticizer thereon can exhibit an optical transmittance from 0% to about 10%. In a further example, the translucency-modulating plasticizer can include p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, C3 to C150 hydrocarbon oil, resorcinol bis(diphenyl phosphate), oligomeric phosphate, C3 to C150 fatty acid esters, N-2-hydroxyethyl-2-pyrrolidone, lactones, decalin, gamma-butyrolactone, dimethylformamide, phenylmethanol, tetraethylene glycol dimethyl ether, tri-(2-ethylhexyl) phosphate, dicyclohexyl phthalate, dibutyl phthalate, tritolyl phosphate, pentaerythritol tetraborate, and trimellitic acid tridecyloctyl ester, or a mixture thereof.

In another example, a three-dimensional printing kit is presented. The 3D printing kit can include a polymer build material and a fusing agent. The polymer build material can include from about 60 wt % to 100 wt % polymeric particles having an average particle size from about 20 μm to about 150 μm and a degree of crystallinity from about 2% to about 60%. The fusing agent formulation prior to admixing with a polymer build material can include an aqueous liquid vehicle, from about 0.5 wt % to about 30 wt % electromagnetic radiation absorber, and from about 5 wt % to about 60 wt % translucency-modulating plasticizer. Upon a three-dimensional object being formed, optical transmittance of the three-dimensional object can be greater than the optical transmittance of the polymeric particles. In one example, the polymeric particles can include nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, polyethylene terephthalate, polybutylene terephthalate, polyacetal, or a mixture thereof. The electromagnetic radiation absorber can be present in the fusing agent from about 1 wt % to about 10 wt % and can be selected from an infrared-absorbing colorant, a near infrared-absorbing colorant, or a carbon black pigment; or both. In another example, the translucency-modulating plasticizer can include p-toluene sulfonamide, m-toluene sulfonamide, o-toluene sulfonamide, or a mixture thereof. In yet another example, the 3D printing kit can further include a detailing agent formulation including a detailing compound.

In yet another example, a three-dimensional printing kit can include a polymer build material, a fusing agent formulation, and a plasticizing agent formulation. The polymer build material can include from about 60 wt % to 100 wt % polymeric particles that can have an average particle size from about 20 μm to about 150 μm and a degree of crystallinity from about 2% to about 60%. The fusing agent can include an aqueous liquid vehicle and from about 0.5 wt % to about 30 wt % electromagnetic radiation absorber. The plasticizing agent formulation can include an aqueous liquid vehicle and from about 5 wt % to about 60 wt % of a translucency-modulating plasticizer. Upon a three-dimensional object being formed, optical transmittance of the three-dimensional object can be greater where the plasticizing agent formulation was applied than the optical transmittance where the plasticizing agent formulation was not applied. In another example, the translucency-modulating plasticizer can include p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof. In yet another example, the fusing agent formulation can further include from about 0.1 wt % to about 10 wt % colorant.

It is noted that when discussing the method for three-dimensional printing and three-dimensional printing kits of the present disclosure, these discussions can be considered applicable to other examples, whether or not they are explicitly discussed in the context of that example. Thus, for example, in discussing a polymer build material related to the method for three-dimensional printing, such disclosure is also relevant to and directly supported in context of a 3D printing kit, the other 3D printing kit, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Three-Dimensional Printing Methods

An example method for three-dimensional printing is illustrated at 100 in FIG. 1. The method can include iteratively applying 110 polymer build material as individual layers the polymer build material can include from about 60 wt % to 100 wt % polymeric particles that can have an average particle size from about 10 μm to about 150 μm and a degree of crystallinity from about 2% to about 60%, to a powder bed; based on a three-dimensional object model, selectively jetting 120 an electromagnetic radiation absorber and a translucency-modulating plasticizer onto individual layers of the polymer build material; and exposing 130 the powder bed to electromagnetic energy to selectively fuse portions of individual layers of the polymer build material together to form a three-dimensional object.

At locations where the translucency-modulating plasticizer may be jetted onto the polymer build material, a 1 mm thick three-dimensional object, for example, can exhibit a continuous optical transmittance from about 5% to about 80%. As used herein, "optical transmittance" is tested using a flat three-dimensional object that is 1 mm thick. Other thicknesses or shapes can be printed, but the evaluation of optical transmittance can be evaluated using a flat 3D object at 1 mm. Other common thickness tested for these types of measurements include 2 mm or 3 mm, but it is emphasized that the values herein are based on a 1 mm object sample. With this in mind, in some other examples, at locations where the translucency-modulating plasticizer may be jetted onto the polymer build material, the three-dimensional object can exhibit optical transmittance from about 20% to about 80%, from about 10% to about 60%, from about 25% to about 75%, from about 30% to about 60%, or from about 40% to 80%.

In some examples, the selective jetting of the electromagnetic radiation absorber and the translucency-modulating plasticizer can occur at the same time via a single fluid or at different times via two different jettable fluids that can be independently jetted onto the polymer build material. In one example, the electromagnetic radiation absorber and the translucency-modulating plasticizer can be included with an aqueous liquid vehicle in a fusing agent formulation. In another example, the electromagnetic radiation absorber can be included with a first aqueous liquid vehicle in a fusing agent formulation and the translucency-modulating plasticizer can be included with a second aqueous liquid vehicle in a plasticizing agent formulation. The first and second aqueous liquid vehicles in these formulations can have the same compositions or can have different compositions.

When the electromagnetic radiation absorber and the translucency-modulating plasticizer are included in different, independently jettable formulations, then these formulations can be printed on the same portions of the polymer build material and/or can be printed on different portions of the polymer build material. For example, the selectively jetting can include, based on the three-dimensional object model, selectively jetting a fusing agent formulation to a first portion of the polymer build material and a second portion of the polymer build material, but not to a third portion of the polymer build material; and based on the three-dimensional object model, selectively jetting the plasticizing agent formulation to the first portion and not the third portion of the polymer build material. The plasticizing agent formulation can either be selectively jetted at a lower amount relative to the amount jetted on the first portion or cannot be jetted at all on the second portion.

Portions of the polymer build material that are printed on with the plasticizing agent formulation can be more translucent than portions of the polymer build material that are not printed on with the plasticizing agent formulation which can include the translucency-modulating plasticizer. Increasing a quantity of translucency-modulating plasticizer jetted on the polymer build material can increase the optical transmittance of the three-dimensional article. Controlling an amount of translucency-modulating plasticizer applied to the polymer build material can permit varied translucency in a single three-dimensional article. Areas where more translucency-modulating plasticizer was jetted can have greater optical transmittance than areas where less or no translucency-modulating plasticizer was jetted. The translucency-modulating plasticizer can provide additional benefits during three-dimensional printing. For example, the translucency-modulating plasticizer can interfere with crystalline domains of the polymer build materials by melting crystal domains initially present in the polymer build material. In addition, the translucency-modulating plasticizer can disrupt the formation of crystalline domains when the polymer build material fuses to form a three-dimensional object.

In some examples, the method can further include, based on the three-dimensional object model, jetting a detailing agent onto individual layers laterally at a border between a first area of the polymer build material contacted by the electromagnetic radiation absorber and an area of the polymer build material uncontacted by the electromagnetic radiation absorber. Printing a detailing agent laterally at a border can increase the definition of the three-dimensional object at the lateral edge and can permit a formation of a smooth edge at the printed three-dimensional object.

Following jetting of the fluid agents (fusing agent formulation, plasticizing agent formulation, and/or detailing agent), an electromagnetic radiation source can be used to provide pulsed or non-pulsed electromagnetic energy sufficiently intense and wavelength coordinated to generate heat at the polymer build material and the jetted fluid agents. The electromagnetic radiation source, for example, can include a scanning lamp energy source with one or multiple high watt bulbs. Non-limiting bulb examples can have a wattage that can range from about 400 watts to about 2,000 watts, such as a pair of 750 watt IR bulbs. In some examples, exposing the powder bed to the electromagnetic energy can raise a temperature of an individual layer of the polymer build material to a temperature ranging from about 1° C. to about 100° C. above a melting temperature of the polymer build material. A portion of the polymer build material having the electromagnetic radiation absorber applied thereto can thus be fused, while areas outside of where the jettable fluid(s) were applied can remain free flowing or substantially free flowing (e.g., they do not become part of the three-dimensional object or part being fabricated).

In some examples, the individual layer can then be cooled to a temperature of less than about 1° C. below a recrystallization temperature for the polymer build material within about thirty seconds of exposing the powder bed to the electromagnetic energy. In one example, cooling can be conducted by immersing the individual layer, the printed three-dimensional object, or the powder bed in a cooling liquid, e.g., water or another fluid (for instance liquid nitrogen). In another example, cooling can be conducted by inserting the individual layer, the printed three-dimensional object, or the powder bed in or on a low temperature container (for instance a refrigerator or Peltier cooler). Rapidly cooling the polymer bed material below the recrystallization temperature of the polymer can prevent or reduce the amount and/or size of crystalline domains that appear in the printed three-dimensional object. Reducing crystalline domains can increase optical transmission by reducing the amount of internal reflections, as indicated by Formula I.

Optical Transmission=Light Intensity−Optical Absorptions−Internal Reflections−Surface Reflections (Formula I)

Figure 2:
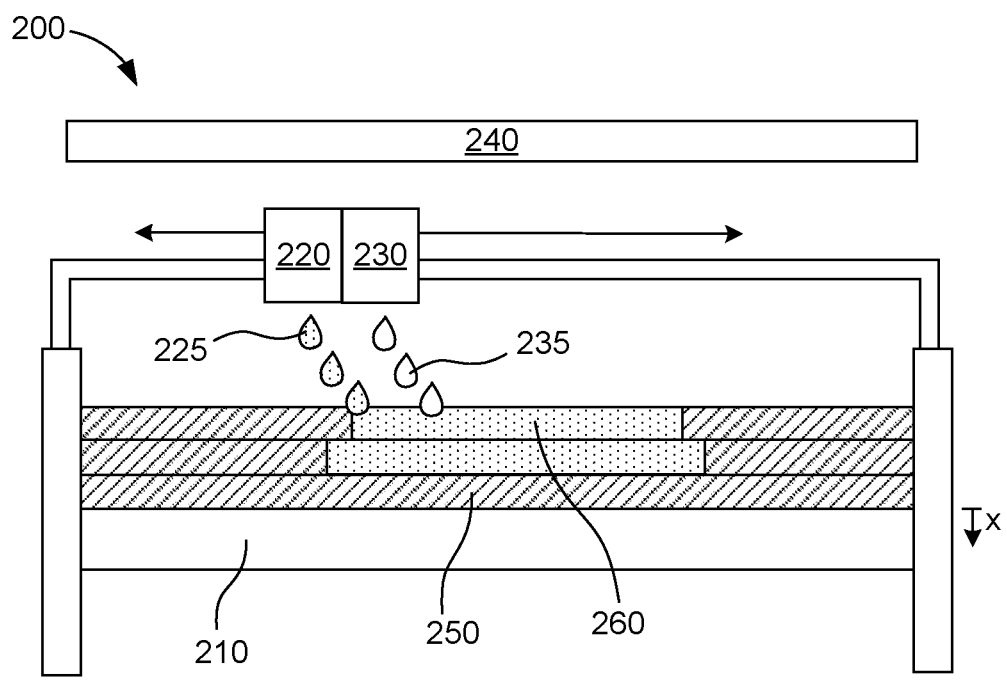
FIG. 2 schematically illustrates an example three-dimensional printing system in accordance with the present disclosure.

In further detail regarding the three-dimensional printing methods, as an example, methods can be carried out using a three-dimensional printing system 200 or apparatus. A schematic illustration of such a system is shown in FIG. 2. The three-dimensional printing kits described herein can be used in this three dimensional printing system, for example. In this example, the three dimensional printing kit includes a polymer build material 250, an electromagnetic radiation absorber that is carried by a fusing agent 225, and a translucency modulating plasticizer that is carried by a plasticizing agent formulation 235. However, it is noted that the electromagnetic radiation absorber and the translucency modulating plasticizer can both be carried by the fusing agent formulation. Thus, the polymer build material 250 can be iteratively applied to a powder bed support 210 or platform (typically with side walls to hold the powder build material therein). Fluid ejectors 220 and 230 can selectively jet a fusing agent formulation, and in some examples, a separate plasticizing agent formulation. The fluid ejectors can be any type of printing apparatus capable of selectively applying the jettable fluid(s). For example, the fluid ejector(s) can be an inkjet applicator (thermal, piezo, etc.), a sprayer, etc.

Following jetting, a radiation source 240 can be used to expose the powder bed to the electromagnetic energy and to selectively fuse portions of individual layers of the polymer build material together to form the three-dimensional object 260. The electromagnetic radiation source can be a static lamp or can travel latterly by carriage along with the fluid ejectors. In one example, the electromagnetic radiation source can be an infrared (IR) or near-infrared light source, such as IR or near-IR curing lamps, IR or near-IR light emitting diodes (LED), or lasers with the desirable IR or near-IR electromagnetic wavelengths. In further detail, the build platform can drop in height (shown at "x"), thus allowing for successive layers of polymer build material to be applied and the respective layers to be patterned one layer at a time and exposed to electromagnetic radiation until the three-dimensional object is formed.

Three-Dimensional Printing Kits

Figure 3A:
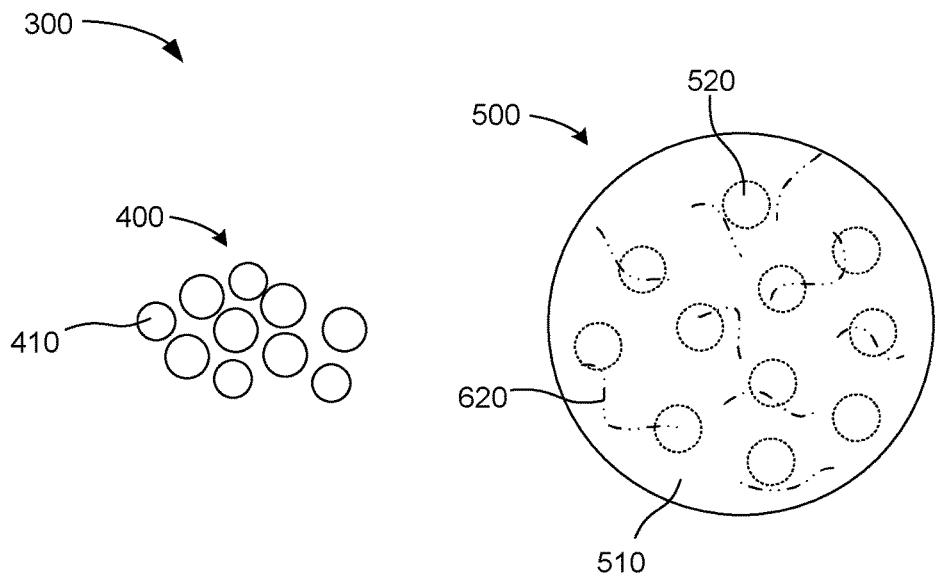
FIG. 3A schematically illustrates an example three-dimensional printing kit in accordance with the present disclosure.
Figure 3B:
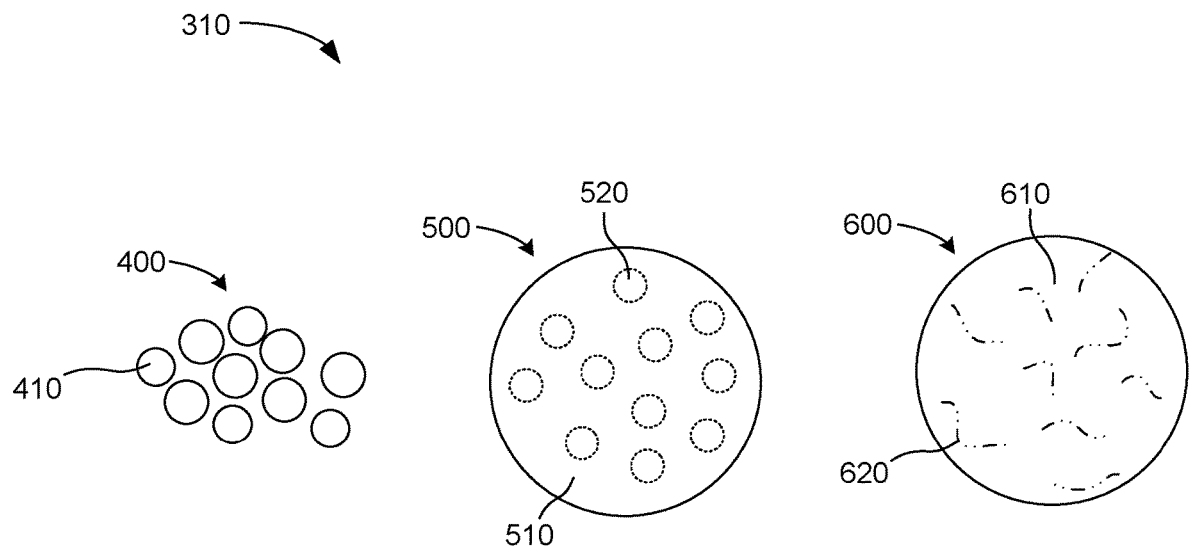
FIG. 3B schematically illustrates an example three-dimensional printing kit in accordance with the present disclosure.

Turning now to more detail regarding the 3D printing kits as shown in FIGS. 3A and 3B by example, the 3D printing kit 300 can include a polymer build material 400 including from about 60 wt % to 100 wt % polymeric particles 410 having an average particle size from about 20 μm to about 150 μm and a degree of crystallinity ranging from about 2% to about 60%. The 3D printing kit can also include a fusing agent formulation 500 including an aqueous liquid vehicle 510, from about 0.5 wt % to about 30 wt % electromagnetic radiation absorber 520, and from about 5 wt % to about 60 wt % translucency-modulating plasticizer 620. See FIG. 3A. A three-dimensional object being formed with the 3D printing kit can have an optical transmittance of the three-dimensional object that can be greater than the optical transmittance of the polymeric particles.

In another example as shown in FIG. 3B, a 3D printing kit 310 can include a polymer build material 400 that can include from about 60 wt % to 100 wt % polymeric particles 410 that can have an average particle size from about 20 μm to about 150 μm and a degree of crystallinity from about 2% to about 60%. The 3D printing kit can further include a fusing agent formulation 500 including an aqueous liquid vehicle 510 and from about 0.5 wt % to about 30 wt % electromagnetic radiation absorber 520. In this example, a separate a plasticizing agent formulation 600 including an aqueous liquid vehicle 610 and from about 5 wt % to about 60 wt % of a translucency-modulating plasticizer 620. A three-dimensional object being formed with the 3D printing kit can have an optical transmittance that can be greater where the plasticizing agent formulation was applied than the optical transmittance where the plasticizing agent formulation was not applied.

In some 3D printing kits, a translucency-modulating plasticizer can be present in both the fusing agent formulation and the plasticizing agent formulation. For example, the fusing agent formulation can include an aqueous liquid vehicle, from about 0.5 wt % to about 30 wt % electromagnetic radiation absorber, and from about 5 wt % to about 60 wt % of a translucency-modulating plasticizer and a plasticizing agent formulation including an aqueous liquid vehicle and from about 5 wt % to about 60 wt % of a translucency-modulating plasticizer. When present in both formulations, the translucency-modulating plasticizer can be the same or different and can be present at the same weight percentage or at different weight percentages.

Polymer Build Material

In any of the 3D printing kits, the polymer build material can be a particulate material or powder, for example. The average particle size can be from about 20 μm to about 150 μm but can also be from about 50 μm to about 125 μm, or from about 60 μm to about 100 μm. The polymer build material can have a degree of crystallinity that can range from about 2% to about 60%. As used herein a "degree of crystallinity" can be defined as the fraction (%) of ordered molecules in a polymer that have a crystalline structure. The degree of crystallinity can be determined using differential scanning calorimetry (DSC). DSC measures differential heat flow per gram of crystalline material during heating of a sample at a rate of about 10° C./min up to about 180° C. then cooling the sample to room temperature (about 10° C.) at a rate of 5° C./min. In yet other examples, the polymer build material can have a degree of crystallinity that can range from about 2% to about 50%, about 3% to about 40%, about 2% to about 15%, about 3% to about 12%, about 20% to about 40%, about 25% to about 50%, or from about 5% to about 10%. The polymer build material should be a semi-crystalline material because native amorphous polymers are heated to a viscous liquid and are not suitable for use in multi-jet fusion printing.

The polymer build material can include semi-crystalline thermoplastic materials with a relatively wide temperature differential between the melting point and re-crystallization, e.g., greater than 5° C. Some specific examples of the polymer build material in the form of powders or particulates can include polyamides (PAs or nylons), such as nylon 6 (PA 6), nylon 9 (PA 9), nylon 11 (PA 11), nylon 12 (PA 12), nylon 66 (PA 66), nylon 612 (PA 612), and other polyamides. Other specific examples of particulate or powder polymeric build material can include polyethylene, polyethylene terephthalate (PET), polystyrene, polyacrylate, polyacetal, polypropylene, polycarbonate, polyester, thermoplastic polyurethane, polyether keytone, polybutylene terephthalate, and blends of any of the multiple polymers listed herein, as well as mixtures thereof. Core shell polymer particles of these materials may also be used. In some examples, the polymer build material can exclude amorphous materials.

The polymer build material can have a melting point that can range from about 75° C. to about 350° C., from about 100° C. to about 300° C., or from about 150° C. to about 250° C. As examples, the polymer build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the particulate polymer build material can be nylon 12, which can have a melting point from about 175° C. to about 200° C.

The polymer build material can be made up of similarly sized particles or differently sized particles. The term "size" or "average particle size describes a diameter or average diameter, which may vary, depending upon the morphology of the individual particle. In an example, the respective particle can have a substantially spherical morphology. A substantially spherical particle (e.g., spherical or near-spherical) has a sphericity of >0.84. Thus, any individual particles having a sphericity of <0.84 are considered non-spherical (irregularly shaped). The particle size of the substantially spherical particle may be provided by its—diameter, and the particle size of a non-spherical particle may be provided by its average diameter (i.e., the average of multiple dimensions across the particle) or by an effective diameter, e.g. the diameter of a sphere with the same mass and density as the non-spherical particle. In some examples, a 1 mm thick layer of the polymer build material as free-flowing particles can exhibit optical transmittance from 0% to about 10% or from about 1% to about 8%, or from about 0.5% to 5%.

The polymer build material may include, in addition to the polymer particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols.

Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In an example, the charging agent can be added in an amount ranging from greater than 0 wt % to 5 wt % based upon the total wt % of the polymer build material.

Flow aid(s) may be added to increase the coating flowability of the polymer build material. Flow aid(s) may be particularly desirable when the particles of the polymer build material are on the smaller end of the particle size range. The flow aid can increase the flowability of the polymer build material by reducing friction, lateral drag, and tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid can be added in an amount ranging from greater than 0 wt % to less than 5 wt % based upon the total wt % of the polymer build material.

Electromagnetic Radiation Absorber

As mentioned, the electromagnetic radiation absorber can be included in a fusing agent formulation, and can include an aqueous liquid vehicle and from about 0.5 wt % to about 30 wt % electromagnetic radiation absorber. The electromagnetic radiation absorber can absorb and convert electromagnetic energy to thermal energy. The electromagnetic radiation absorber can be, for example, an infrared-absorbing colorant, a near-infrared-absorbing colorant, or a carbon black pigment. Infrared absorbing colorants can extend from the nominal red edge of the visible spectrum at 700 nm up to 1 mm, but more particularly, the infrared absorbing colorants, such as dyes, can be used in the jettable fluids in the range of about 800 nm to 1400 nm to convert absorbed light energy to thermal energy. Similar characteristics can be achieved using near-infrared colorants within the range of 950 nm to 1150 nm, for example. When used with a light source that emits a wavelength in this range and a polymer build material that has a low absorbance in this range, the near-infrared dye can cause the printed portions of the polymer build material to melt and coalesce without melting the remaining polymer build material. Thus, near-infrared dyes can be just as efficient or even more efficient at generating heat and coalescing the polymer build material when compared to carbon black (which can have the characteristic of providing black or gray parts in color).

Infrared colorants, such as near-infrared colorants, used as electromagnetic radiation absorber can have substantially no impact on the apparent color of the jettable fluid. This allows the formulation of colorless jettable fluids that can be used to coalesce the polymer build material, but which will not impart any visible color to the part. Alternatively, the jettable fluids can include from about 0.1 wt % to about 10 wt % additional pigments and/or dyes to give the jettable fluid a color such as cyan, magenta, yellow, black, red, orange, green, purple, blue, pink, etc. The colorant can be added to a single jettable fluid with both the electromagnetic radiation absorber and the translucency-modulating plasticizer, to one or both jettable fluids that contain one of the electromagnetic radiation absorber or the translucency-modulating plasticizer, or to separate inks that can be printed alongside of the electromagnetic radiation absorber and the translucency-modulating plasticizer.

Example near-infrared dyes that can be used include aminium-based near-infrared dyes manufactured by HW Sands Corporation: SDA 1906 ($\lambda_{max}$ absorption 993 nm), SDA 3755 ($\lambda_{max}$ absorption 1049 nm), and SDA 7630 ($\lambda_{max}$ absorption 1070 nm), as well as Ni-dithiolene-based dyes with very low absorption in visible light range, e.g., very low absorbance from 400 nm to 700 nm. However, these near-infrared dyes have high absorbance in the range of 800 nm to 1400 nm. Black jettable fluids, on the other hand, with carbon black pigment used as the electromagnetic radiation absorber, have high absorbance within the visible spectrum (and are generally considered to have a broad absorbance spectrum), so depending on the desired result (e.g., black or colorless with the option to add colorant) appropriate absorbers can be selected accordingly. There are other electromagnetic radiation absorbers that can be used that have a broader absorption spectrum in the visible range, but which are not black. Examples include aminium-based water-soluble dyes, tetraphenyldiamine-based water-soluble near-infrared dyes, cyanine-based water-soluble near-infrared dyes, and dithiolene-based water-soluble near-infrared dyes. In some examples, electromagnetic radiation absorber can be present in the fusing agent fluid, whether present with or without the translucency-modifying plasticizer, at from 0.5 wt % to 30 wt %, from 5 wt % to 25 wt %, from 1 wt % to 20 wt %, etc.

Figure 4:
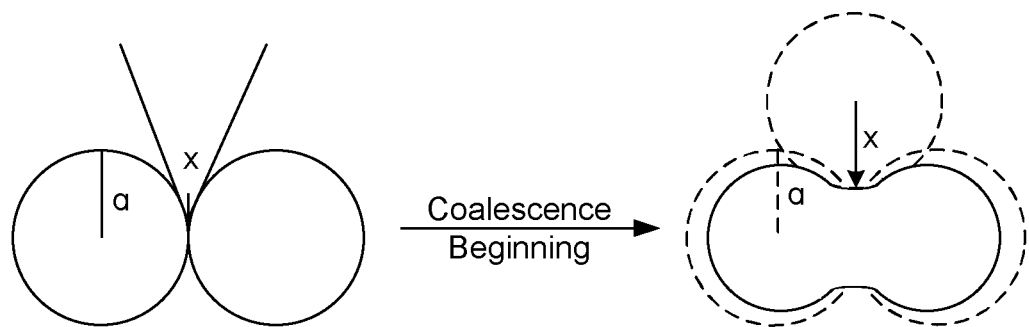
FIG. 4 schematically illustrates an example of particle coalescence.

The electromagnetic radiation absorber can provide a boosting capacity sufficient to increase the temperature of the polymer build material above the melting or softening point of the polymer build material. As used herein, "temperature boosting capacity" refers to the ability of an absorber to convert near-infrared light energy into thermal energy to increase the temperature of the printed polymer build material over and above the temperature of the unprinted portion of the polymer build material. Typically, the polymer build material can be fused together when the temperature increases to or above the melting or softening temperature of the polymer, but fusion can also occur in some instance below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the particles can coalesce to form a part while the remaining polymer powder remains loose. FIG. 4 graphically illustrates coalescence between two particles of a polymer build material. If the upper softening range was used, the whole powder bed can become cake-like. The "softening point," as used herein, refers to the temperature at which the polymer particles coalesce while the remaining powder remains separate and loose.

Although melting point and softening point are often described herein as the temperatures for coalescing the polymer build material, as mentioned, in some cases the polymer particles can coalesce at temperatures slightly below the melting point or softening point. Therefore, as used herein "melting point" and "softening point" can include temperatures slightly lower, such as up to about 5° C. lower than the actual melting point or softening point. For example, even with the expanded temperature processing window, there may be instances where some over-fusing in certain locations can be acceptable in order to achieve a high-density, e.g., 90%, 95%, 99%, etc., along a larger area of the part, so on average, the part density may still be increased compared to parts prepared without the use of an translucency-modulating plasticizer.

In one example, the electromagnetic radiation absorber can have a temperature boosting capacity from about 5° C. to about 30° C. for a polymer build material with a melting or softening point from about 75° C. to about 350° C. If the polymer build material can be at a temperature within about 5° C. to about 30° C. of the melting or softening point, then the electromagnetic radiation absorber can boost the temperature of the printed powder up to or above the melting or softening point of the polymer build material, while the unprinted build material remains at a lower temperature. In some examples, the polymer build material can be preheated to a temperature ranging from about 4° C. to about 30° C., from about 10° C. to about 30° C., or from about 10° C. to about 20° C. lower than the melting or softening point of the polymer. The jettable fluid(s) can then be printed onto the polymer build material and irradiated with electromagnetic radiation sufficient to coalesce the printed portion of the polymer build material. Thus, the electromagnetic radiation absorber can provide a temperature boost to the polymer build material compared to unprinted areas of the polymer build material.

Translucency-Modulating Plasticizer

In order to increase the optical translucency of a three-dimensional article, a translucency-modulating plasticizer can be jetted on the polymer build material. The translucency-modulating plasticizer can increase optical translucency by increasing fusing for void elimination (preventing air gaps from forming), melting the initial crystalline domains present in the polymer build material, and/or disrupting crystalline formation during the hardening/solidification process of fusing of the polymer build material. Interfering with the crystalline domains can increase optical translucency because microscopic crystalline domains within a three-dimensional object can scatter/reflect light.

In some examples, the translucency-modulating plasticizer can include p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, dioctyl phthalate, methyl 4-hydroxybenzoate, bisphenol-A, dimethyl sulfoxide, N-methyl pyrrolidone, 2-pyrrolidone, tri-(2-ethylhexyl) phosphate, dicyclohexyl phthalate, dibutyl phthalate, mineral oil, C3 to C150 hydrocarbon oil, oligomeric phosphate, C3 to C150 fatty acid esters, N-2-hydroxy-ethyl-2-pyrrolidone, lactones, decalin, gamma-butyrolactone, dimethylformamide, phenylmethanol, tetraethylene glycol dimethyl ether, tri-(2-ethylhexyl) phosphate, dicyclohexyl phthalate, dibutyl phthalate, tritolyl phosphate, pentaerythritol tetraborate, and trimellitic acid tridecyloctyl ester, or a mixture thereof. In one example, the translucency-modulating plasticizer can be toluene sulfonamide. In another example, the translucency-modulating plasticizer can include p-toluene sulfonamide, m-toluene sulfonamide, o-toluene sulfonamide, or a mixture thereof. In a further example, the translucency-modulating plasticizer can include p-toluene sulfonamide, m-toluene sulfonamide, o-toluene sulfonamide, urea, ethylene carbonate, propylene carbonate, diethylene glycol, triethylene glycol, tetraethylene glycol, methyl 4-hydroxybenzoate, dimethyl sulfoxide, dioctyl phthalate, gamma-butyrolactone, or a mixture thereof.

The translucency-modulating plasticizer can be present in a fusing agent formulation, a plasticizing agent formulation, or both of these formulations (with or without the electromagnetic radiation absorber) at from 5 wt % to 60 wt %, from about 10 wt % to about 50 wt %, from about 25 wt % to 50 wt %, from about 30 wt % to about 60 wt %, or from about 5 wt % to 40 wt %. The greater the amount of translucency-modulating plasticizer, the greater the optical transmittance of three-dimensional printed object including the translucency-modulating plasticizer.

The melting point of the translucency-modulating plasticizer can also be considered when pairing a polymer build material therewith. For example, when a polymer build material can have a low melting point relative to the melting point of the polymer build material, then the translucency-modulating plasticizer may not mix well with the molten polymer build material. Thus, for example, the melting point of the translucency-modulating plasticizer can be selected as having a melting point (Plasticizer $T_m$) within about 35° C. below the melting temperature of the polymer build material (Build Material $T_m$), or in another example, within about 15° C. below the melting temperature of the polymer build material. For example, p-toluene sulfonamide and m-toluene have a melting temperature just below about 140° C. (Plasticizer $T_m$=about 136° C. to about 138° C.) and o-toluene sulfonamide has a melting temperature of just below about 160° C. (Plasticizer $T_m$=about 156° C. to about 158° C.). Thus, based on the melting temperature of the translucency-modulating plasticizer, a good choice for the polymer build material may be a polymer having a melting temperature (Build Material $T_m$) of less than about 173° C. to about 193° C., depending on the toluene sulfonamide selected or mixture thereof selected for use; or with tighter tolerances, e.g., having a melting point less than about 15° C. below the build material melting temperature, a good choice for the polymer build material may be a polymer having a melting temperature (Build Material $T_m$) of less than about 153° C. to about 173° C., again depending on the toluene sulfonamide or mixture thereof selected for use.

Other Fluid Agents

In yet other examples, the 3D printing kit can further include a detailing agent formulation including a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water or an organic cosolvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or higher. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In another example, there may likewise be a coloring agent present that can provide coloration to the 3D printed article. The coloring agent can include a liquid vehicle, e.g., water, organic cosolvent, surfactant, and/or other compounds that may be present in coloring agents or inks. The coloring agent can also include a colorant, such as a pigment and/or a dye.

Aqueous Liquid Vehicle

The jettable fluid(s) or agents described herein, e.g., fusing agent formulations, plasticizing agent formulations, and/or the detailing agent formulations, can include other components other than the electromagnetic radiation absorber, the translucency-modulating plasticizer, and/or the detailing compound in the form of an aqueous liquid vehicle. The jettable fluid can include water; colorants, e.g., dye and/or pigment; organic co-solvents; non-ionic, cationic, and/or anionic surfactants; biocides, fungicides, and other microbial agents; viscosity modifiers; and/or dispersants.

In one example, an organic co-solvent may not be a plasticizer for the polymer build material, but can be added in for a different purpose, e.g., jettability, jetting reliability, decap performance, viscosity modification, etc. Classes of co-solvents that can be used can include organic co-solvents including aliphatic alcohols, aromatic alcohols, diols, glycol ethers, polyglycol ethers, caprolactams, formamides, acetamides, and C3 to C150 alcohols. Examples of such compounds can include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. To the extent these co-solvents act as a temperature reducing plasticizer for a specific polymer build material, some of these other co-solvents can be considered to be applicable in that context.

Further, non-ionic, cationic, and/or anionic surfactant can be present, ranging from 0.01 wt % to 20 wt %, if present. Examples include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, or the like. Commercially available examples of surfactants can include, but are not limited to, TERGITOL® TMN-6, TERGITOL® 15S7, TERGITOL® 15S9, LEG-1, LEG-7; Triton™ X-100, and Triton™ X-405 all available from The Dow Chemical Company (USA)). The amount of surfactant added to the formulation of this disclosure may range from 0.01 wt % to 20 wt %.

Biocides, fungicides, and other microbial agents, can also be used. Example antimicrobial agents can include the NUOSEPT® (Ashland Inc. (USA)), VANCIDE® (R.T. Vanderbilt Co. (USA)), ACTICIDE® B20 and ACTICIDE® M20 (Thor Chemicals (U.K.)), PROXEL® GXL (Arch Chemicals, Inc. (USA)), BARDAC® 2250, 2280, BARQUAT® 50-65B, and CARBOQUAT® 250-T, (Lonza Ltd. Corp. (Switzerland)), KORDEK® MLX (The Dow Chemical Co. (USA)), and combinations thereof. In an example, the a total amount of antimicrobial agents in the liquid vehicle can range from about 0.1 wt % to about 1 wt % with respect to the total wt % of the jettable fluid.

Viscosity modifiers and buffers may also be present. For example, a buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich (USA)), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich (USA)), beta-alanine, betaine, or mixtures thereof. Such additives can be present at from 0.01 wt % to 20 wt %.

The liquid vehicle can also include dispersants if there are solids, such as pigment, that should be dispersed in the jettable fluid for purposes of retaining solid suspension, jettability, etc.

Definitions

It is noted that, as used in this specification and the appended claims, the singular forms "a," "an," and "the" include plural referents unless the context clearly dictates otherwise.

As used herein, "liquid vehicle" refers to water and in some examples, other components, such as, surfactants, solvents, co-solvents, anti-kogation agents, buffers, biocides, sequestering agents, viscosity modifiers, surface-active agents, and the like.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

To evaluate the translucency-modulating effect of an example translucency-modulating plasticizer, three admixtures were prepared. The admixture combined varying amounts of toluene sulfonamide (translucency-modulating plasticizer) with a fusing agent formulation, see Table 1.

TABLE 1

| Fusing Agent Formulation | | |
| --- | --- | --- |
| Ingredient* | Component Type | Weight Percent |
| 1-methyl-2-pyrrolidone | Solvent | 40 |
| Pentanol | Co-Solvent | 19 |
| CRODAFOS ® O3A | Emulsifier | 1 |
| SURFYNOL ® SEF | Surfactant | 1.5 |
| CAPSTONE ® FS-35 | Wetting Agent | 0.10 |
| DOWFAX ™ 2A1 | Scaling Inhibitor | 0.20 |

TABLE 1-continued

| Fusing Agent Formulation | | |
| --- | --- | --- |
| Ingredient* | Component Type | Weight Percent |
| TRILON ® M | Chelating Agent | 0.06 |
| PROXEL ® GXL | Biocide | 0.36 |
| Water | Solvent | Balance |

CRODAFOS® O3A is available from Croda Personal Care (U.K), SURFYNOL® SEF is available from Evonik (USA), CAPSTONE® FS-35 is available from DuPont (USA), DOWFAX™ 2A1 is available from Dow Chemical Company (USA), TRILON® M is available from BASF Corporation (Germany), PROXEL® GXL is available from Lonza America, Inc. (USA).

The varying amounts of toluene sulfonamide admixed with the fusing agent formulation in table 1 were respectively about 26 wt %, about 33 wt %, and about 50 wt %, with the balance of the formulation being the fusing agent formulation. The admixture was combined at 0.2 wt % with 98 wt % polyamide 12 (or PA12; polymer build material) particles. The PA12 particles had an average PA12 polymer particle size of about 30 microns and a degree of crystallinity of about 25%.

The admixtures were heated to 170° C. on a hot plate and subsequently cooled. Following cooling, the admixtures were placed on a patterned substrate (white background with periodically spaced black lines) and the samples were visually inspected for translucency. The admixture containing 50 wt % toluene sulfonamide in the formulation that was added to the PA12 particles was optically translucent and permitted visual inspection of the lines on the patterned substrate. The admixtures containing 26 wt % and 33 wt % toluene sulfonamide in the formulations that were added to the PA12 particles were not identical in translucency, but neither permitted visual inspection of the lines on the patterned substrate.

Example 2

A multi-jet fluid 3D printer was used to print several 11 mm diameter discs with a 1 mm thickness (height) on a patterned plaque (Discs A-D). The fusing agent had the general formulation shown in Table 1 above and was admixed with varying amounts of toluene sulfonamide, as shown in Table 2. The polymer build material used was 100 wt % PA12 particles with an average PA12 polymer particle size of 30 micron and a degree of crystallinity of about 25%

TABLE 2

Weight percentage toluene sulfonamide admixed with fusing agent and Maximum Temperature

| | Fusing Agent | | |
| --- | --- | --- | --- |
| Disc ID | Toluene sulfonamide (wt %) | Fusing Agent (wt %) | Temperature Maximum ° C. |
| A | 62 | 38 | 183 |
| B | 72 | 28 | 182 |
| C | 78 | 22 | 181 |
| D | 84 | 16 | 176 |

An electromagnetic radiation source was used to transmit IR electromagnetic energy at the PA12 powder with the fusing agent thereon at various temperatures with a maximum temperature also shown in Table 1. The maximum temperature was decreased as the amount of toluene sulfonamide in the functional agent was increased in order to eliminate the possibility that an increase in temperature provided an increase in translucency.

The printed discs with the patterned backing were visually inspected. Discs printed with increased amounts of toluene sulfonamide had increased optical transmission and portions of the pattern on the plaque were visible. To quantify the optical transmission, the printed discs were placed on a light table to illuminate the printed discs from behind and a Sentech 5.1 MP color USB vision CMOS camera was used to capture images. The captured images were converted from linear RGB to luminance. The luminance by the light table was divided by the luminance of the disc for transmission. A PR-670 tele-spectrophotometer having a spot size of 7 mm at 1 degree aperture was used to measure spectral radiance and establish ground truth transmission measurements. The results are presented in Table 3 below.

TABLE 3

Optical Transmission with Patterned Backing

| Disc Name | % Transmission |
|---|---|
| A | 5.8 |
| B | 7 |
| C | 10.5 |
| D | 12 |

The optical transmission of the printed discs with the patterned backing increased as the amount of toluene sulfonamide was increased and the amount of the fusing agent formulation was decreased.

In order to determine an overall transmission level for the printed discs, the patterned backing was removed, was measured on a commercially available transmission color measurement device as indicated above. The optical transmission drastically increased and transmission of the transmission ranged from 45% to 75%, as shown below in Table 4 below.

TABLE 4

Optical Transmission with Patterned Backing Removed

| Disc Name | % Transmission | wt % Toluene Sulfonamide in 3D Printed Discs |
|---|---|---|
| A | 45.9 | 2.6 |
| B | 55.5 | 5.1 |
| C | 68.9 | 9.7 |
| D | 74.7 | 17.7 |

Figure 5:
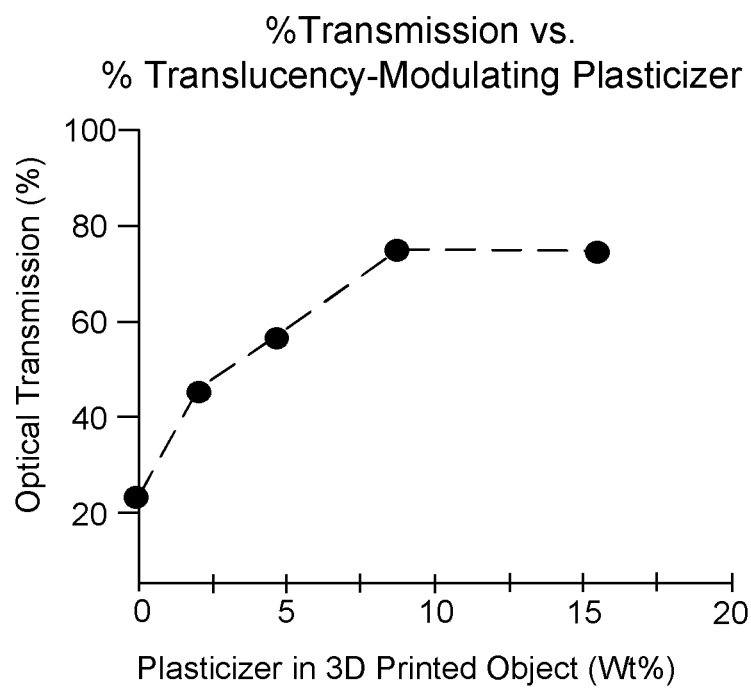
FIG. 5 graphically presents percent transmittance vs. percent translucency-modulating plasticizer in accordance with an example of the present disclosure.

As can be seen above, and graphically illustrated in FIG. 5, as the amount of toluene sulfonamide in the printed disc increased the percent of optical transmission also increased. This example indicates that an optical transmission of a printed object is correlated to an increase in toluene sulfonamide loading, e.g. the translucency-modulating plasticizer.

While the present technology has been described with reference to certain examples, it is appreciated that various modifications, changes, omissions, and substitutions can be made without departing from the spirit of the disclosure. It is intended, therefore, that the disclosure be limited only by the scope of the following claims.

What is claimed is:

1. A method for three-dimensional printing, comprising:
    iteratively applying a polymer build material as individual layers to a powder bed, the polymer build material including from about 60 wt % to 100 wt % of polymeric particles having an average particle size of from about 10 µm to about 150 µm and a degree of crystallinity of from about 2% to about 60%;
    based on a three-dimensional object model, selectively jetting an electromagnetic radiation absorber and a translucency-modulating plasticizer onto individual layers of the polymer build material, the translucency-modulating plasticizer being selected from the group consisting of p-toluene sulfonamide, m-toluene sulfonamide, o-toluene sulfonamide, urea, ethylene carbonate, propylene carbonate, diethylene glycol, triethylene glycol, tetraethylene glycol, dioctyl phthalate, methyl 4-hydroxybenzoate, bisphenol-A, dimethyl sulfoxide, N-methyl pyrrolidone, 2-pyrrolidone, dicyclohexyl phthalate, dibutyl phthalate, mineral oil, C3 to C150 hydrocarbon oil, resorcinol bis(diphenyl phosphate), oligomeric phosphate, C3 to C150 fatty acid ester, N-2-hydroxyethyl-2-pyrrolidone, lactones, decalin, gamma-butyrolactone, dimethylformamide, phenylmethanol, tetraethylene glycol dimethyl ether, tri-(2-ethylhexyl) phosphate, tritolyl phosphate, pentaerythritol tetraborate, trimellitic acid tridecyloctyl ester, and a mixture thereof; and
    exposing the powder bed to electromagnetic energy to selectively fuse portions of individual layers of the polymer build material together to form a three-dimensional object, wherein the three-dimensional object exhibits optical transmittance from about 5% to about 80% at locations where the polymer build material includes the jetted translucency-modulating plasticizer.

2. The method of claim 1, wherein the electromagnetic radiation absorber and the translucency-modulating plasticizer are included in a fusing agent formulation including an aqueous liquid vehicle, the electromagnetic radiation absorber, and the translucency-modulating plasticizer.

3. The method of claim 1, wherein the electromagnetic radiation absorber is included in a fusing agent formulation including a first aqueous liquid vehicle and the electromagnetic radiation absorber, and the translucency-modulating plasticizer is included in a separate plasticizing agent formulation including a second aqueous liquid vehicle and the translucency-modulating plasticizer, wherein the fusing agent formulation and the plasticizing agent formulation are independently jettable onto the polymer build material at the powder bed.

4. The method of claim 3, wherein the selectively jetting includes:
    based on the three-dimensional object model, selectively jetting the fusing agent formulation to a first portion of the polymer build material and a second portion of the polymer build material, but not to a third portion of the polymer build material; and
    based on the three-dimensional object model, selectively jetting the plasticizing agent formulation to the first portion but not the third portion, and wherein at the second portion, the plasticizing agent formulation is not jetted or is jetted at a lower amount relative to the first portion,
    wherein the three-dimensional object is formed at the first portion and the second portion, but not at the third portion of the polymer build material, and wherein the first portion is more translucent than the second portion.

5. The method of claim 1, wherein based on the three-dimensional object model, the method further comprises jetting a detailing agent onto individual layers laterally at a border between a first area of the polymer build material contacted by the electromagnetic radiation absorber and a second area of the polymer build material that is not contacted by the electromagnetic radiation absorber.

6. The method of claim 1, wherein the exposing of the powder bed to the electromagnetic energy raises an individual layer of the polymer build material to a temperature from about 1° C. to about 100° C. above a melting temperature of the polymer build material, and wherein the individual layer is cooled to a temperature of less than about 1° C. below a recrystallization temperature for the polymer build material within about thirty seconds of exposing the powder bed to the electromagnetic energy.

7. The method of claim 1, wherein a 1 mm thick layer of the polymer build material as free-flowing particles prior to jetting of the translucency-modulating plasticizer thereon exhibits an optical transmittance of from 0% to about 10%.

8. The method of claim 1, wherein the translucency-modulating plasticizer is selected from the group consisting of p-toluene sulfonamide, m-toluene sulfonamide, o-toluene sulfonamide, ethylene carbonate, propylene carbonate, methyl 4-hydroxybenzoate, bisphenol-A, 2-pyrrolidone, C3 to C150 hydrocarbon oil, N-2-hydroxyethyl-2-pyrrolidone, lactones, decalin, gamma-butyrolactone, dimethylformamide, phenylmethanol, tetraethylene glycol dimethyl ether, pentaerythritol tetraborate, trimellitic acid tridecyloctyl ester, and a mixture thereof.

9. The method of claim 1, wherein the translucency-modulating plasticizer is a toluene sulfonamide.

* * * * *